Figure 1:
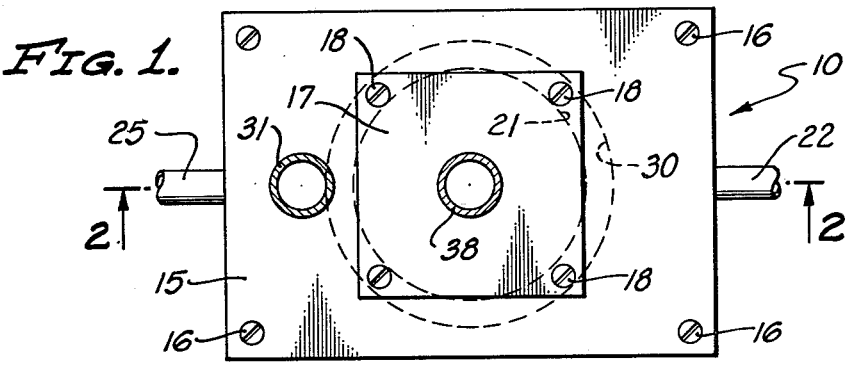

INVENTOR
LESTER D. SAVAGE, JR.
BY HIS ATTORNEYS
HARRIS, KIECH, RUSSELL & KERN

United States Patent Office 3,060,744
Patented Oct. 30, 1962

3,060,744
SWITCH FOR FLUID PRESSURE SIGNALS
Lester D. Savage, Jr., Milngavie, Scotland, assignor to Beckman Instruments, Inc., Fullerton, Calif., a corporation of California
Filed Apr. 4, 1960, Ser. No. 19,871
10 Claims. (Cl. 73—407)

This invention relates to switches for fluid pressure signals and, in particular, to switches used to selectively connect one of a plurality of fluid pressure signals to a transducer or other output device.

Ordinarily, a separate transducer or pressure measuring device is connected to each point at which a fluid pressure is to be measured. Often a continuous measure of pressure at each point is not necessary, permitting a single transducer to be time-shared with a plurality of fluid pressure sources, resulting in a cost saving for the installation. This type of system is particularly advantageous where a large number of pressure points are being measured, such as in the order of a hundred or more.

The use of a single transducer with a plurality of signal sources requires some type of switching equipment which ordinarily introduces other problems including disturbances to the sources and the transducer due to the switches and the switching operation. Accordingly, it is an object of the present invention to provide a selector switch for coupling fluid pressure signal sources to a transducer which switch introduces substantially no disturbance into the measuring system. A further object is to provide such a switch which may be used in conjunction with a large number of similar switches for sequentially connecting a plurality of signal sources to a transducer. A further object is to provide such a switch that is accurate in operation and relatively inexpensive to manufacture.

It is an object of the invention to provide a switch for fluid pressure signals which can selectively effectuate either a substantially perfect pressure communication between two zones or a substantially perfect absence of pressure communication between the said two zones. A further object of the invention is to provide a switch by which pressure communication between two zones can be brought about without fluid communication between these zones. Another object of the invention is to provide a switch which, when it switches from the Off status (absence of pressure communication) to the On status (presence of pressure communication) does not bring about a volume change of the fluid medium the pressure of which is to be measured. A still further object is to provide such a switch that is rugged and dependable and which is not likely to be damaged by pressure overloads resulting from improper operation of the switch-sequencing equipment.

It is an object of the invention to provide a system for connecting each of a plurality of fluid pressure signals to a transducer and including a control unit for actuating the switches in any desired sequence.

It is an object of the invention to provide a switch for fluid pressure signals having a limber element supporting a plate within a housing and dividing the interior of the housing into a transducer zone and a signal zone, with the transducer zone filled with a liquid and connected to a pressure transducer, a piston mounted in the housing for sliding movement toward and away from the plate, means for coupling the signal zone to the fluid pressure signal source, and means for exerting a force on the piston to move the piston into engagement with the plate for clamping the plate against the housing. A further object is to provide such a switch operable in conjunction with a plurality of similar switches with the transducer and with the signal zone of each switch connected to a different signal source. Another object is to provide a control unit for such a system including means for actuating the piston in each switch to move all plates except one to the clamp or fixed position, leaving one plate free for transmitting a fluid signal pressure to the liquid in the transducer zones.

The invention also comprises novel details of construction and novel combinations and arrangements of parts, which will more fully appear in the course of the following description. The drawing merely shows and the description merely describes a preferred embodiment of the present invention which is given by way of illustration or example.

Figure 2:
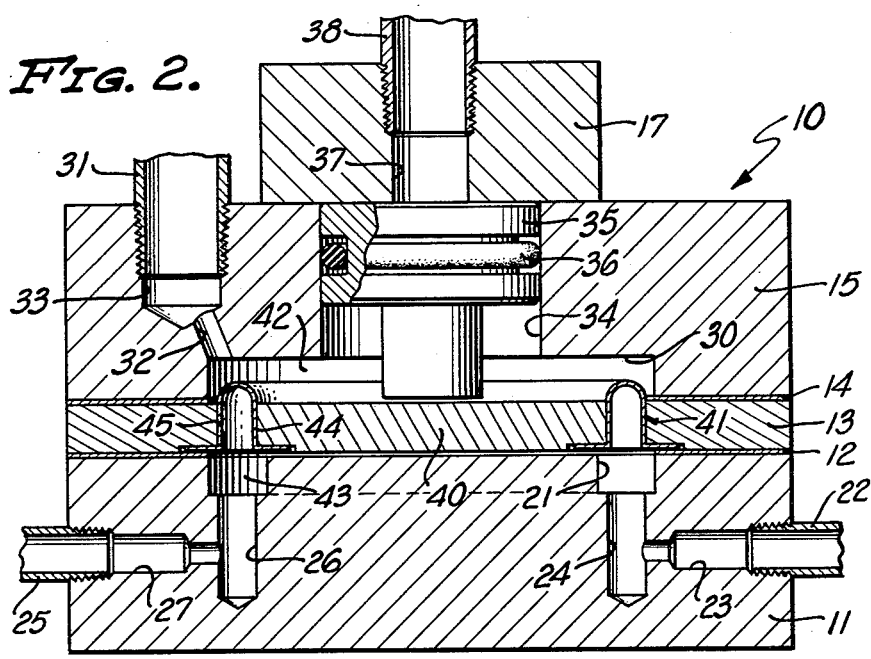

In the drawing:
FIG. 1 is a top view of a preferred form of the invention;
FIG. 2 is an enlarged sectional view taken along the line 2—2 of FIG. 1; and
FIG. 3 is a diagram showing the switch of FIG. 1 operated in conjunction with a plurality of similar switches.

The switch includes a housing 10 having a bottom member 11, a gasket 12, a spacer ring 13, another gasket 14, and a top member 15 joined together with screws 16. A cap 17 is mounted on the top member 15 by screws 18. An annular passage 21 in the bottom member 11 communicates with a conduit 22 through passages 23 and 24, and with a conduit 25 through passages 26, 27. An opening 30 in the top member 15 communicates with a conduit 31 through passages 32, 33. A cylindrical opening 34 serves as a cylinder for a piston 35 positioned therein. The cap 17 serves to maintain the piston 35 within the opening 34 and an O-ring 36 provides a pressure seal around the piston. A passage 37 in the cap 17 communicates with a conduit 38 providing for application of fluid pressure to the top end of the piston 35.

A plate 40 is supported within the housing 10 by a limber element 41. The limber element is preferably made of a thin resilient material such as stainless steel, beryllium copper or spring brass and maintains the plate located within the housing while providing very little restraint against movement of the plate perpendicular to the plane of the plate. The limber element and plate serve to divide the interior of the housing into a signal zone 42 and a transducer zone 43. In the preferred form shown herein, the limber element is annular with a U-shaped cross section. The inner arm 44 of the U section is fixed to the plate 40 and the outer arm 45 is fixed to the spacer ring 13, the element being attached by suitable means such as by soldering or welding.

Figure 3:
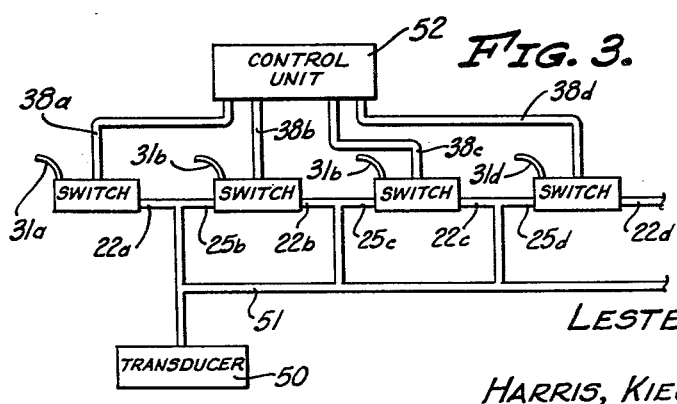

The switch of FIGS. 1 and 2 may be operated in conjunction with a plurality of similar switches, as shown in FIG. 3. Each of the conduits 31a–31d is connected to a source of a fluid pressure signal that is to be measured, typically an air pressure signal. The transducer zones 43 of each of the switches are connected together and to a transducer 50 through another conduit 51. The transducer zones, the interconnecting conduit and the transducer are filled with a liquid such as oil, that is substantially incompressible at the pressures at which the system will operate. The conduits 38a–38d are connected to a control unit 52 which serves to select the particular signal source that is to be connected to the transducer.

When the system is in operation, the control unit 52 will supply a fluid pressure to each conduit 38 except one, moving the piston 35 downward into engagement with the plate 40 and forcing the plate 40 against the bottom member 11. Each of the switches so energized will be in the Off or clamp position. In the one switch that is unenergized, the conduit 38 will be vented to the atmosphere and the pressure signal in the conduit 31 will move the piston to the upper On or working position as shown in FIG. 2. The plate 40 of this particular switch will be free to respond to pressure changes and the position of the plate will be a function of the fluid pressure in the conduit 31 and, hence, in the signal zone 42. As the pressure at both sides of the plate is now equal, the transducer will be subjected to the pressure in the conduit 31. The sensitive element of the transducer will undergo an ordinarily small volume change as a function of the pressure that is exerted. An equal volume change is, of course, transmitted through the substantially incompressible liquid to the plate 40 and the limber element 44. The ratio of the force exerted by the limber element on the plate 40 to deformation of the limber element is quite small by virtue of its dimensions and shape, so that the limber element has a small influence only on the calibration of the transducer, and furthermore, because of its substantially linear force-deformation ratio a negligible influence on the accuracy and linearity of the system.

When it is desired to measure a different signal source, fluid pressure is applied to the conduit 38 of the particular switch to move it to the Off or clamp position and the conduit 38 of another switch is vented to the atmosphere by the control unit. The maximum pressure exerted by the system will occur when all of the pistons are energized at once, which ordinarily will not occur in the operation of the system. However, the limber elements are easily designed to withstand this pressure and the transducer should be selected to be operable at such pressure.

The signal sources for the fluid pressure signals being measured are often of very small volume so that small volume changes produced by the measuring system will adversely affect the source. A measuring system which produces a volume change in the source is analogous to an amplifier having a low input impedance which loads down the electrical signal source. Ideally, the electrical amplifier has an infinite input impedance and, practically, a very high input impedance so as to draw very little current from the electrical signal source. The switch of the present invention provides means for measuring a fluid pressuree signal with a substantially infinite impedance device. The components of the switch are dimensioned so that the ratio of (a) the area of the plate 40 plus one half the projected area of the limber element in a plane parallel to the flat surfaces of the plate to (b) the area of the piston 35 is equal to the ratio of (c) the stroke of the piston to (d) the stroke of the plate, i.e., $$\frac{a}{b}=\frac{c}{d}$$

The stroke of the piston is the distance which it moves between the On or working position as seen in FIG. 2 and the Off or clamp position with the piston engaging the plate forcing it against the bottom member. The stroke of the plate is the distance which the plate moves from the neutral working position as seen in FIG. 2 to the clamp position in engagement with the bottom member. When these ratios are equal, the volume change in the signal zone 42 will be zero. Thus, switching from the Off position to the On position will not affect the signal source.

As should be obvious to one skilled in the art, the function performed by the piston 35 can equally well be carried out by analogous devices. A corrugated structure such as bellows could be used, for instance, when the sealing of the piston in the cylinder would be difficult because of the presence of corrosive gases. Furthermore, a structure such as the limber element could equally well be employed.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a switch for fluid pressure signals, the combination of: a housing having an open interior; a plate; a limber element having one portion fixed to said plate and another portion fixed to said housing for supporting said plate within said housing and dividing said interior into a transducer zone and a signal zone, with said transducer zone filled with a liquid; a piston mounted in said housing in said signal zone for sliding movement toward and away from said plate; means for coupling said signal zone to a fluid pressure signal source; means for coupling said transducer zone to a pressure transducer; and means for intermittently exerting a force on said piston of a magnitude to move said piston into engagement with said plate for clamping said plate against said housing with said plate in the absence of said force moving relatively to said housing as a function of the pressure in said signal zone.

2. In a switch for fluid pressure signals, the combination of: a housing having an open interior; a plate; a limber element having one portion fixed to said plate and another portion fixed to said housing for supporting said plate within said housing and dividing said interior into a transducer zone and a signal zone, with said transducer zone filled with a liquid, and with said plate movable between a clamp position in engagement with said housing for preventing volume changes in said transducer zone and a working position out of contact with said housing; a piston mounted in said housing for sliding movement toward and away from said plate; means for coupling said signal zone to a fluid pressure signal source; means for coupling said transducer zone to a pressure transducer; and means for intermittently exerting a force on said piston of a magnitude to move said piston into engagement with said plate and fix said plate in said clamp position with said plate in the absence of said force moving relatively to said housing as a function of the pressure in said signal zone.

3. In a switch for fluid pressure signals, the combination of: a housing having an open interior; a plate; a limber element having one portion fixed to said plate and another portion fixed to said housing for supporting said plate within said housing and dividing said interior into a transducer zone and a signal zone, with said transducer zone filled with a liquid, and with said plate movable between a clamp position in engagement with said housing for preventing volume changes in said transducer zone and a working position out of contact with said housing; a piston mounted in said housing in said signal zone for sliding movement between a rest position away from said plate and a clamp position engaging said plate; means for coupling said signal zone to a fluid pressure signal source; means for coupling said transducer zone to a pressure transducer; and means for intermittently exerting a force on said piston of a magnitude to move said piston to said clamp position fixing said plate in its clamp position, with said plate in the absence of said force moving relatively to said housing as a function of the pressure in said signal zone, with the ratio of the area of said plate plus one half the projected area of said limber element to the area of said piston substantially equal to the ratio of the stroke of said piston between the rest and clamp positions to the stroke of said plate between the neutral working and clamp positions and with said stroke of said piston greater than said stroke of said plate.

4. In a switch for fluid pressure signals, the combination of: a housing having an open interior; a circular plate; a ring-shaped limber element having its inner edge fixed to said plate and its outer edge fixed to said housing for supporting said plate within said housing and dividing said interior into a transducer zone and a signal zone, with said transducer zone filled with a liquid, and with said plate movable between a clamp position in engagement with said housing for preventing volume changes in said transducer zone and a working position out of contact with said housing; a member mounted in said housing in said signal zone for sliding movement toward and away from said plate; means for coupling said signal zone to a fluid pressure signal source for exerting a pressure on said plate opposing the pressure of said liquid; means for coupling said transducer zone to a pressure transducer; and means for intermittently exerting a force on said member of a magnitude to move said member into engagement with said plate and fix said plate in said clamp position, with said plate in the absence of said force moving relatively to said housing as a function of the pressure in said signal zone.

5. In a switch for fluid pressure signals, the combination of: a housing having an open interior; a circular plate; an annular member of resilient material having a U-shaped cross section, with the inner arm of the U fixed to said plate and the outer arm fixed to said housing for supporting said plate within said housing and dividing said interior into a transducer zone and a signal zone, with said transducer zone filled with a liquid; a piston mounted in said housing in said signal zone for sliding movement toward and away from said plate; means for coupling said signal zone to a fluid pressure signal source; means for coupling said transducer zone to a pressure transducer; and means for intermittently exerting a force on said piston of a magnitude to move said piston into engagement with said plate for clamping said plate against said housing, with said plate in the absence of said force moving relatively to said housing as a function of the pressure in said signal zone.

6. In a fluid pressure switch, the combination of: a housing enclosing an interior; a moving member sealed within said housing and dividing said interior into first and second zones; means for coupling said first zone to a first pressure line; means for coupling said second zone to a second pressure line; a plunger sealed within said housing and movable to engage said moving member and force said member to a fixed position; and means for intermittently moving said plunger into engagement with said moving member forcing said member to said fixed position, with said member in the absence of said engagement moving relatively to said housing as a function of the pressure in one of said zones.

7. In a system for selectively sampling a plurality of fluid pressure signals, the combination of: a plurality of pneumatic switches, each of said switches having a transducer zone and a signal zone separated by a movable element which varies the volume of the transducer zone as a function of the pressure in the signal zone, each of said switches having a control piston for driving the movable element to a fixed position, with the control piston energizable from an external pressure source; a pressure transducer; conduit means for coupling said transducer to the transducer zone of each of said switches, with said conduit means, transducer zones and transducer filled with a liquid; means for coupling the signal zone of each switch to a fluid pressure signal source; a control unit for producing a plurality of control pressures; and means for coupling the control pressures of said control unit to each switch for actuating the control piston thereof, with said control unit producing a pressure at each piston except the piston of the switch connected to the selected signal source.

8. In a switch for selectively admitting a pressure exerted in a first zone to a second zone and excluding the pressure from the second zone, the combination of: a housing enclosing first and second zones; a fluid impervious, movable element mounted in said housing between said zones and preventing communication of fluid between said first and second zones; and control means for selectively holding said movable element in a fixed position with respect to said housing for excluding communication of pressure from said first zone, and freeing said movable element for movement relative to said housing for communication of pressure between said first zone and said second zone.

9. A switch as defined in claim 8 in which said movable element comprises a plate located in an opening in said housing between said zones, with the edges of said opening and said plate connected by a deformable member that hermetically closes said first zone from said second zone.

10. A switch as defined in claim 9 in which said control means comprises a control member located opposite said plate and in said first zone and slidable relative to said housing for pressing said plate against said housing.

References Cited in the file of this patent

UNITED STATES PATENTS

| | | |
|---|---|---|
| 1,371,243 | Hopwood | Mar. 15, 1921 |
| 1,381,139 | Smoot | June 14, 1921 |
| 1,400,550 | Hopwood | Dec. 20, 1921 |
| 2,814,198 | Howland | Nov. 26, 1957 |
| 2,889,704 | Baker | June 9, 1959 |
| 2,897,670 | Bentley | Aug. 4, 1959 |